(12) United States Patent
Eisengräber et al.

(10) Patent No.: US 7,958,975 B2
(45) Date of Patent: Jun. 14, 2011

(54) BRAKE CALIPER

(75) Inventors: Reinhard Eisengräber, Wachtberg (DE); Kristof Terfloth, Beilstein (DE)

(73) Assignee: TMD Friction Service GmbH, Leverkusen (DE)

( * ) Notice: Subject to any disclaimer, the term of this patent is extended or adjusted under 35 U.S.C. 154(b) by 0 days.

(21) Appl. No.: 10/544,775

(22) PCT Filed: Feb. 9, 2004

(86) PCT No.: PCT/EP2004/001156
§ 371 (c)(1),
(2), (4) Date: Jun. 2, 2006

(87) PCT Pub. No.: WO2004/072506
PCT Pub. Date: Aug. 26, 2004

(65) Prior Publication Data
US 2006/0219490 A1     Oct. 5, 2006

(30) Foreign Application Priority Data

Feb. 14, 2003  (DE) ................. 103 06 137

(51) Int. Cl.
  *F16D 65/40*  (2006.01)
(52) U.S. Cl. ............... 188/73.38; 188/73.31; 188/73.37; 188/72.5; 188/73.46; 188/73.47
(58) Field of Classification Search ............... 188/73.39, 188/73.31, 73.37, 72.5, 73.96, 73.47
See application file for complete search history.

(56) References Cited

U.S. PATENT DOCUMENTS

| | | | | |
|---|---|---|---|---|
| 3,552,528 | A | * | 1/1971 | Seip ............................ 188/79.64 |
| 3,722,634 | A | * | 3/1973 | Ogasawara et al. ........ 188/73.37 |
| 3,887,045 | A | | 6/1975 | DeHoff et al. |
| 4,111,568 | A | | 9/1978 | Wing |
| 4,540,068 | A | * | 9/1985 | Ritsema ..................... 188/73.39 |
| 5,363,944 | A | * | 11/1994 | Thiel et al. .................. 188/73.31 |
| 5,464,077 | A | | 11/1995 | Thiel et al. |
| 5,806,794 | A | * | 9/1998 | Hrusch et al. ................. 244/111 |
| 6,302,243 | B1 | | 10/2001 | Ruiz |

FOREIGN PATENT DOCUMENTS

| | | |
|---|---|---|
| DE | 24 40 076 | 3/1976 |
| DE | 41 22 859 A1 | 7/1991 |
| DE | 42 36 684 A | 5/1994 |
| DE | 196 22 546 A1 | 12/1997 |
| DE | 198 49 309 A1 | 4/2000 |
| EP | 40 20 668 A1 | 1/1992 |
| EP | 0 489 453 A1 | 6/1992 |
| JP | H01-156208 | 10/1989 |
| JP | H03-216411 | 9/1991 |
| JP | 06-54930 | 7/1994 |
| JP | 8-21463 | 1/1996 |
| JP | 08-112772 | 5/1996 |
| JP | 08-200325 | 8/1996 |
| JP | 2000-087461 | 3/2000 |

* cited by examiner

*Primary Examiner* — Robert Siconolfi
*Assistant Examiner* — James K Hsiao
(74) *Attorney, Agent, or Firm* — Blakely, Sokoloff, Taylor & Zafman LLP

(57) ABSTRACT

A brake caliper on a brake, such as a disc brake includes raised sections, which can be embodied as plateaus. The raised sections are tensioned against each other via a connector device by the introduction of tensile or compression forces. Noises occurring during braking can thus be significantly reduced.

30 Claims, 4 Drawing Sheets

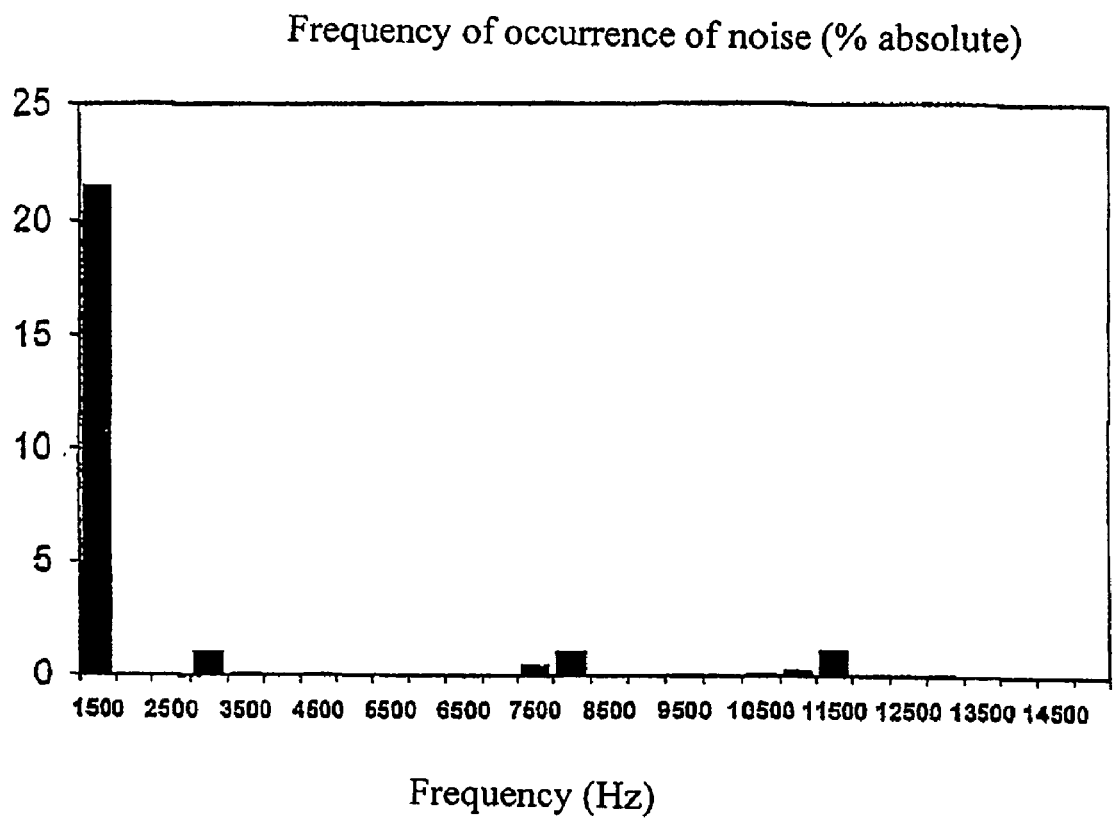
Fig. 3A
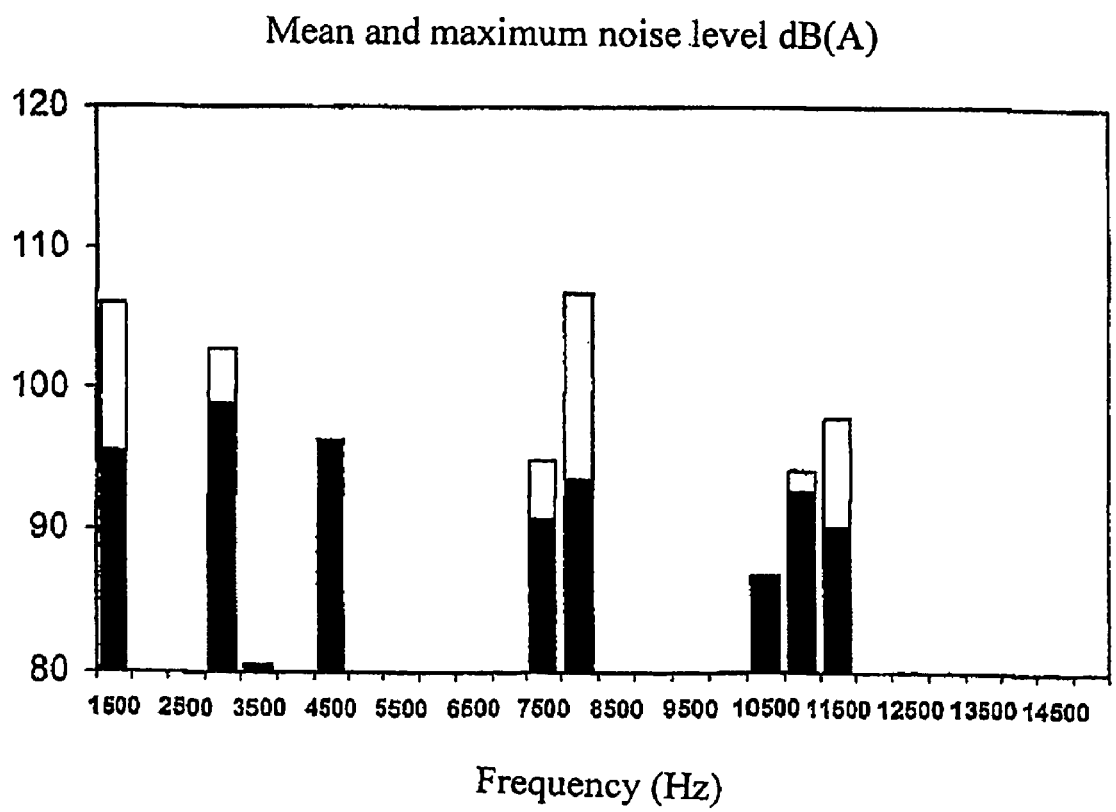

Frequency of occurrence of noise (% absolute)
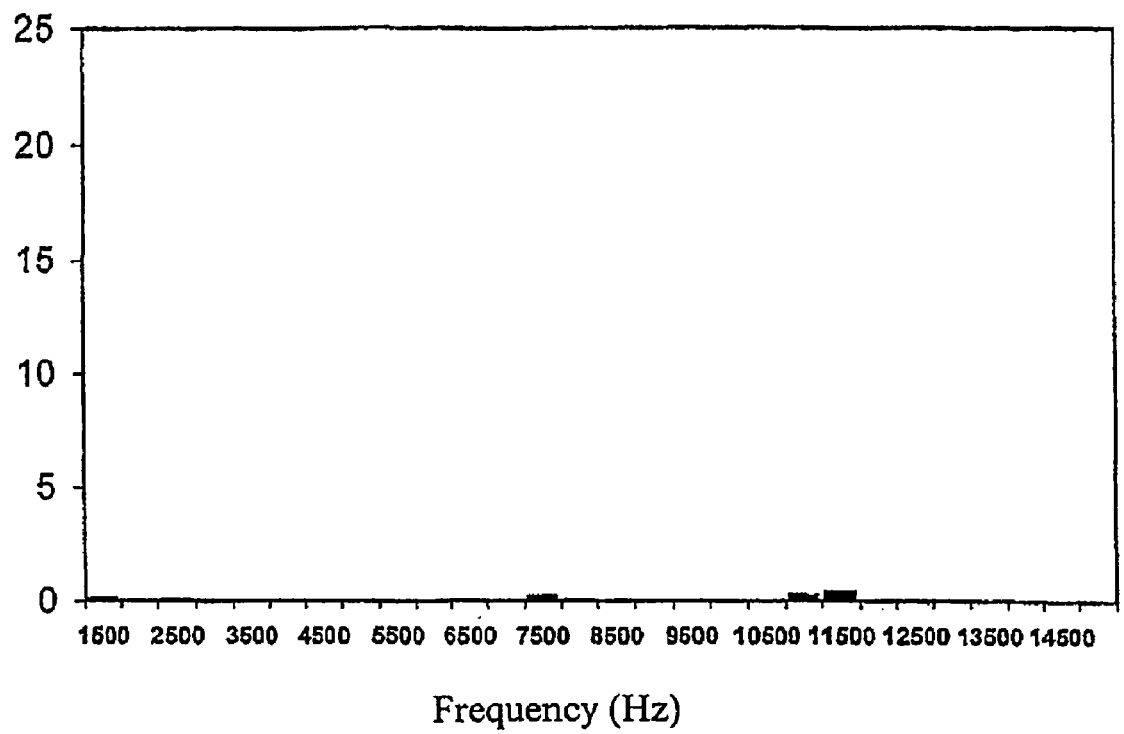
Fig. 3B
Mean and maximum noise level dB(A)
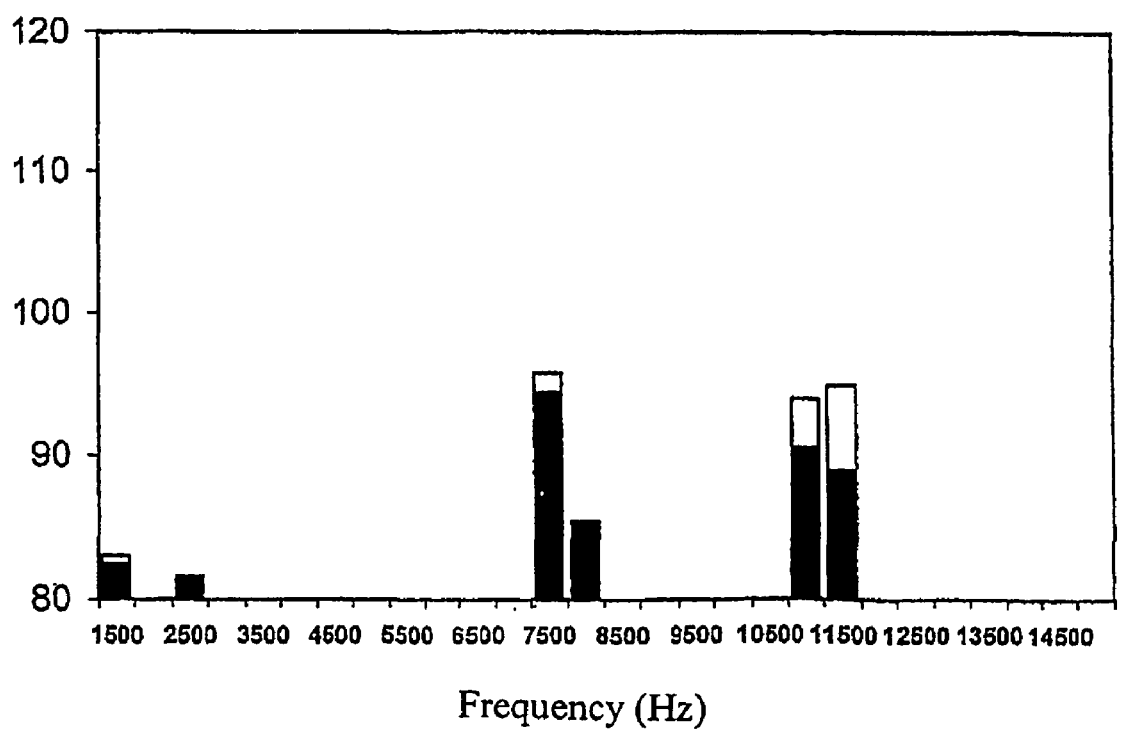

BRAKE CALIPER

BACKGROUND OF THE INVENTION

This is a non-provisional application claiming the benefit of International application number PCT/EP2004/001156 filed Feb. 9, 2004.

The invention relates to a brake caliper of a brake, particularly a disc brake for motor vehicles, including at least two raised sections which are opposed to one another and define a free space between them and are connected together by a connecting device extending across the free space.

When braking a motor vehicle, braking noises can occur. The cause of these noises is vibrations of the braking system, which can occur in a wide frequency range. So-called "squealing" of the brakes, which occurs at frequencies above ca. 1 kHZ, is perceived as being particularly annoying. In the case of vibrations at a lower frequency (up to 400 Hz), one refers to "rumbling" of the brakes. The latter may be sensed both audibly and also via the steering wheel.

A wide variety of steps have already been taken in practice in order to reduce the vibrations. Thus it is known, for instance, to attach weights to the brake caliper in order thereby to increase the characteristic frequency. The effect of such a step is, however, limited. Furthermore, the space available for the fastening of the weights is frequently limited.

It is the object of the invention to further reduce the vibrations resulting in braking noises.

BRIEF SUMMARY OF THE INVENTION

In order to solve this object, the brake caliper referred to above is characterised in accordance with the invention in that compression or tension forces are applied to the raised sections via the connecting device.

The invention is based on the recognition that a purely mechanical connection does not result in the desired noise reduction but that instead additional bracing of the brake caliper, that is to say the application of tension or compression forces, drastically reduces undesired braking noises. The connecting device can be attached anywhere where the brake caliper affords two raised sections, which may be connected together, or raised sections can be created. The sections can be disposed directly adjacent to one another or be situated relatively far apart. The connecting device can also extend laterally of the brake caliper, transversely to the brake caliper or in any desired direction. As regards the degree of bracing, different types of brake calipers may be optimised as regards low noise generation. The invention has a positive effect on the braking comfort and reduces differences in thickness of the disc which occur in the course of the service life.

The brake caliper can be in the form of a fixed caliper or a floating caliper for a brake disc and engage around the brake disc on both sides, whereby the outer surface of the brake caliper preferably affords the raised sections. The outer surface of the brake caliper can start to vibrate particularly easily during a braking process for reasons caused by its structure and the connecting device engages precisely at those positions and effectively reduces the vibrations by the applied bracing. The connecting device can be secured to the brake caliper in different manners. It is particularly advantageous if the raised sections are constructed in the form of plateaus and the plateaus have an internal screw thread. The plateaus act as an engagement surface for the connecting device. They can be fabricated during the manufacture of the brake caliper or produced subsequently. Subsequent installation of the connecting device will be effected if the brake in question generates braking noises, when it is used. Older models may thus be "retrofitted".

The connecting device is advantageously constructed in the manner of a strut. It can be screwed on to the plateaus. Alternatively or additionally to the screw connection, the connecting device can engage behind the raised sections or plateaus. This acts as a further anchorage.

As an alternative to the strut-like construction of the connecting device, it is proposed that the connecting device is a cable. The cable is generally in the form of a wire cable and can of course only transmit tensional forces. A cable as the connecting device has the advantage of a low weight whilst simultaneously bracing the raised sections.

The bracing of the brake caliper can be affected in different manners. A particularly simple possibility consists of selecting the dimensions of the fastenings of the connecting device to be larger or smaller than the corresponding dimensions on the brake caliper. In the case of a strut-like connecting device, the spacing of the fastening openings is selected, depending on whether bracing is desired in the tension direction or the compression direction, to be smaller or larger than the spacing of the fastening openings associated with the raised sections. The raised sections are then braced when a screw connection is produced. Alternatively, a tension lock can be provided, as is proposed in an important embodiment of the invention. The tension lock can carry e.g. a right-handed/left-handed screw thread, by means of which the bracing is adjusted. A tension lock is particularly simple to handle and, in particular, may be used in a variable manner. Thus a (single) connecting device with a tension lock can be used with a number of types of brake caliper.

As a result of the connecting device additionally attached to the brake caliper in the form of a separate element, it is possible to extend the functional region of the brake caliper. The connecting device can serve, for instance, as a cable holder or a hose holder. Constructing it in the form of a design element is equally possible. Attempts have frequently been made in recent times to provide components, which were originally exclusively functional, with a particular design which refers to the manufacturer and/or has an aesthetic component. A further function can be allocated to the connecting device if it is constructed as a cooling element. It is proposed, for instance, that the connecting device be provided with one or more air guiding plates, which guide the air in the direction towards the brake and cause additional cooling of the brake. Over and above its function as a vibration eliminator, the connecting device can thus reduce peak temperatures of brakes and thus improve the braking effect.

BRIEF DESCRIPTION OF THE DRAWINGS

The invention will be explained in more detail by preferred exemplary embodiments and measurement results in conjunction with the accompanying drawings, in which:

FIG. 3A shows the results of a measurement of noises from a conventional brake caliper without a connecting device occurring in a braking process; and FIG. 3B shows the results of a measurement of noises from a brake caliper in accordance with the invention occurring during a braking process.

DETAILED DESCRIPTION OF THE INVENTION

Figure 1:
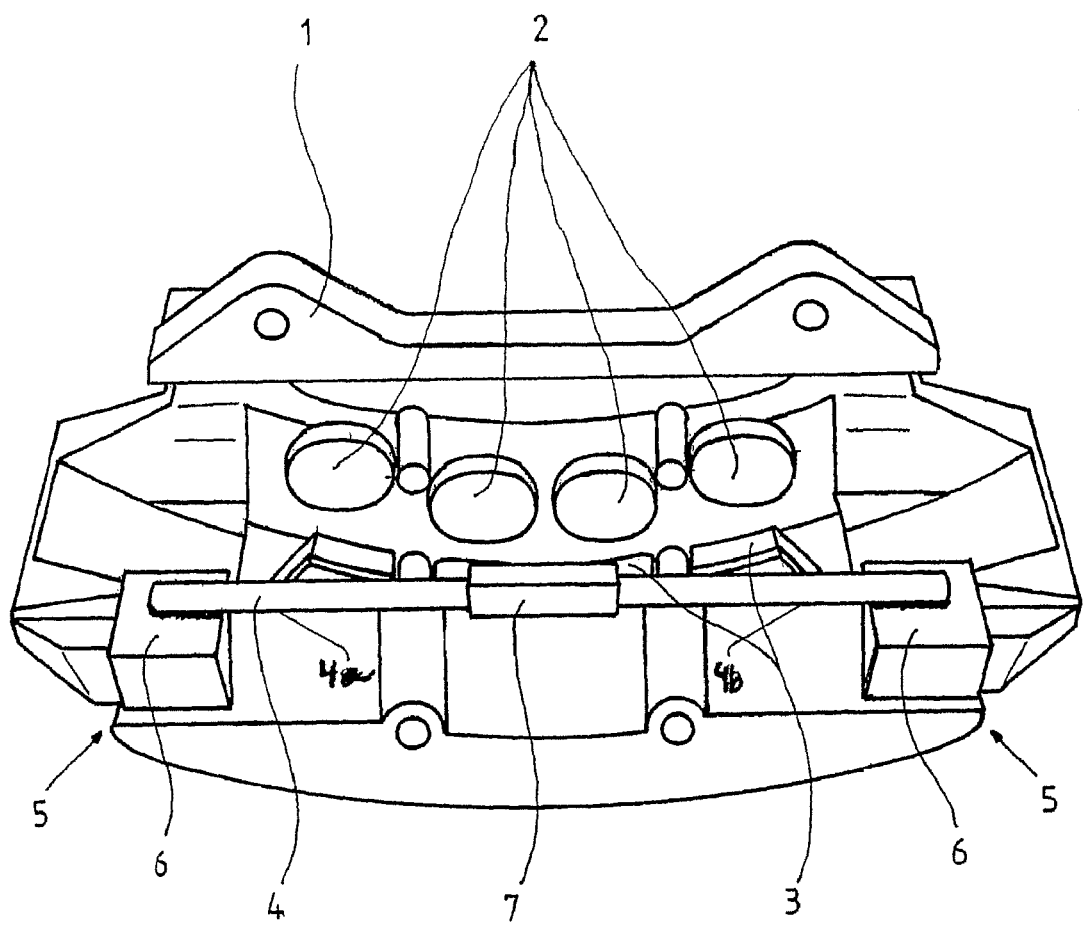
FIG. 1 is a schematic perspective view of a first exemplary embodiment in accordance with the invention.

FIG. 1 shows a brake caliper in accordance with the invention, which is constructed in the form of a fixed caliper. The fixed caliper is secured with a mounting 1 to a motor vehicle axle (not shown). On each side, the brake caliper has four pistons 2, which press during a braking process against a brake lining 3 (shown on only one side) and press the brake lining against a brake disc (not shown).

During a braking process, noise can be generated, which is caused by vibrations of the brake. Such braking noises are undesired. In accordance with the invention, a connecting device 4 is provided, which is of bar-shaped construction in the present exemplary embodiment and braces two raised sections 5 of the brake caliper. As a result of the applied tension (or compression) forces, the oscillation characteristics of the brake caliper alter. The characteristic frequency of the brake caliper is shifted.

The invention is particularly effective when raised sections of a brake caliper project relatively far away from the brake caliper and thus can oscillate "freely" without the invention. In the case of a fixed caliper, these sections are situated on its outer surface. The mutual bracing of these raised sections significantly reduces the tendency to oscillation.

In the exemplary embodiment shown in FIG. 1, the raised sections are constructed in the form of plateaus. The connecting device 4 may be particularly favourably secured to the plateaus. Internal screw threads can be formed in the plateaus, whereby the connecting device 4 can be firmly screwed to the plateaus by means of a screw (not shown). A welded solution is indicated in the present case. A screw connection is also considered to be advantageous. Further types of connection may basically be considered: riveting, upsetting, clipping, inserting. Furthermore, the plateau 6 can be provided at the time of manufacture of the brake caliper or be fabricated subsequently, for instance by grinding or milling the raised sections 5.

The tension or compression forces can basically be adjusted by adjusting the geometrical dimensions of the connecting device with respect to the raised sections 5. It is also possible for the bracing to be effected by means of an oblique positioning of at least one of the screw threads formed in the raised sections 5. The specific exemplary embodiment shown in FIG. 1 has a tensioning device 7 with a right/left handed screw thread, by means of which the tension or compression force may be adjusted. Such a tension lock may be easily manufactured and has a high service life. Many types of brake caliper can be braced with a single connecting device equipped with a tension lock. The length of the connecting device is adapted by appropriately positioning the tension lock.

Figure 2:
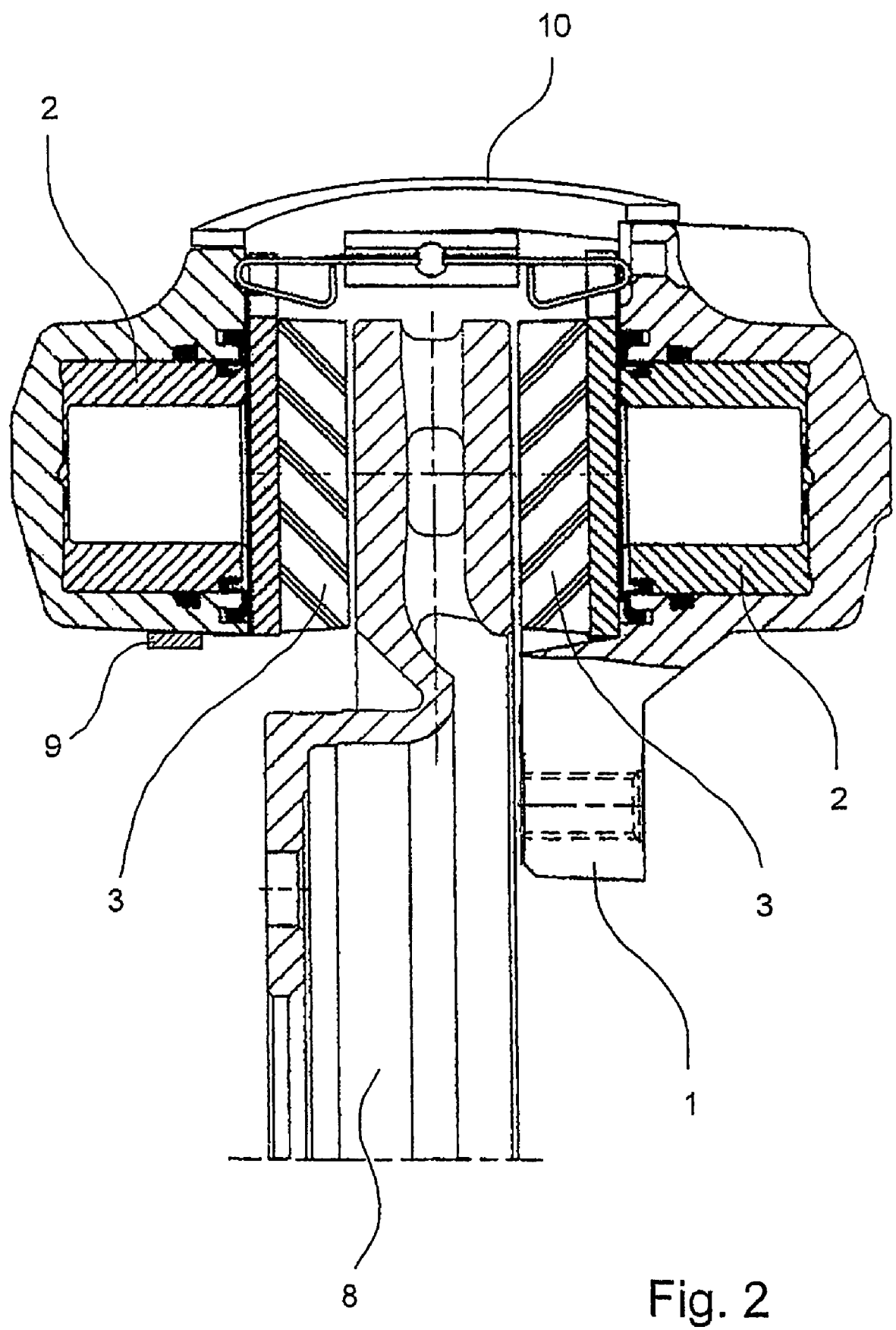
FIG. 2 is a schematic sectional view of a second exemplary embodiment in accordance with the invention in conjunction with a brake disc.

FIG. 2 is a side sectional view of a second exemplary embodiment in accordance with the invention, to which a brake disc 8 has been added for the purposes of illustration. The mounting 1 is constructed integrally with the brake caliper.

Disposed on the outer surface of the brake caliper is a connecting device 9, which is constructed in the manner of a strut. A second bar 10 is also provided which braces the two sides of the brake caliper.

FIG. 3A shows measurement results in connection with a conventional fixed caliper. In the upper diagram, the frequency, at which the vibrations occur, is plotted on the abscissa and the frequency of occurrence of the noises (in %) is plotted on the ordinate. As shown, the generation of noise was measured in a total of nine frequency bands (1.5 kHZ, 3 kHZ, 3.5 kHZ, 4.5 kHZ, 7.5 kHZ, 8 kHZ, 10.5 kHZ, 11 kHZ, 11.5 kHZ) whereby, in particular, the frequency of occurrence of the noise generation was significant at a frequency of 1.5 kHZ.

The lower diagram of FIG. 3A shows the mean and the maximum noise level in dB at the corresponding frequencies of the upper diagram. The dark columns correspond to the mean noise level and the light columns correspond to the maximum noise level. A few of the maximum noise levels reach peak values of over 100 dB.

FIG. 3B shows, in a manner similar to FIG. 3A, in the upper diagram, the frequency of occurrence of the noises in dependence on the frequency and, in the lower diagram, the corresponding mean and maximum noise levels. It may clearly be seen that the frequency of occurrence of the noises when using a connecting device in accordance with the invention, which applies tension or compression forces, can be drastically reduced. At a frequency of 1.5 kHZ, scarcely any noises occur. The magnitude of the noise level was able also to be significantly reduced over nearly the entire frequency range.

Modifications are of course possible within the scope of the inventive concept. Thus the connecting device is not limited to a special material. It can, for instance, be in the form of a metal or plastic component. A carbon fibre construction is also possible. The construction of the caliper can be selected at will. The brake caliper can be of one-piece construction or of multi-piece construction. It can consist of cast iron, aluminium or, for instance, of a magnesium alloy. The invention is also applicable to brake calipers with different forms of actuation, e.g. hydraulic, pneumatic, electric etc. In addition to the bracing in accordance with the invention, weights can also be attached to the brake caliper in the conventional manner.

The invention claimed is:

1. A brake caliper of a brake, particularly of a disc brake for motor vehicles, said brake caliper comprising:
    at least two raised sections which are opposite to one another on the same axial side of the brake disc and define a free space between them, and
    a connecting device including a turnbuckle extending across said free space laterally of the brake caliper on one axial side of the brake disc, connecting together said at least two raised sections on the one side of the brake disc, said turnbuckle configured to apply a bracing force to the raised sections, the configuration of said turnbuckle being set to reduce vibration of said brake caliper during a braking process, the turnbuckle including screw threads having threadingly engaged connectors coupled to the at least two raised sections, said bracing force being one of tension or compression depending on a rotational position of said threadingly engaged connectors.

2. The brake caliper as claimed in claim 1, wherein said force is selected from a group of forces consisting of a compression force and a tension force.

3. The brake caliper as claimed in claim 2, wherein said brake caliper includes an outer surface, and wherein the at least two raised sections are formed at said outer surface.

4. The brake caliper as claimed in claim 3, wherein the brake caliper is constructed as a fixed caliper.

5. The brake caliper as claimed in claim 3, wherein said brake caliper is constructed as floating caliper.

6. The brake caliper as claimed in claim 2, wherein said raised sections comprise plateaus, which includes an internal screw thread.

7. The brake caliper as claimed in claim 6, wherein the connecting device is constructed in the manner of a strut and is screwed to the plateaus.

8. The brake caliper s claimed in claim 1, wherein the connecting device is constructed in the manner of a cable.

9. The brake caliper as claimed in claim 1, wherein the connecting device functions as a cooling element.

10. A brake caliper for motor vehicles, comprising:
a caliper body;
two raised sections, which are spaced from one another and located on the same axial side of said caliper body; and
a connecting device including a turnbuckle connecting together said two raised sections extending laterally of the brake caliper on one axial side of the brake disc, said turnbuckle configured to apply a bracing force to the raised sections on the one side of the brake disc, the configuration of said turnbuckle being set to reduce vibration of said brake caliper during a braking process, the turnbuckle including screw threads having threadingly engaged connectors coupled to the two raised sections, said bracing force being one of tension or compression depending on a rotational position of said threadingly engaged connectors.

11. The brake caliper as claimed in claim 10, wherein said force is selected from a group of forces consisting of a compression force and a tension force.

12. The brake caliper as claimed in claim 11, wherein said brake caliper tides an outer surface, and wherein the two raised sections are formed at said outer surface.

13. The brake caliper as claimed in claim 12, wherein the brake caliper is constructed as a fixed caliper.

14. The brake caliper as claimed in claim 12, wherein said brake caliper is constructed as floating caliper.

15. The brake caliper as claimed in claim 11, wherein said raised sections comprise plateaus, which have an internal screw thread.

16. The brake caliper as claimed in claim 15, wherein the connecting device is constructed in the manner of a strut and is screwed to the plateaus.

17. The brake caliper as claimed in claim 10, wherein the connecting device is constructed in the manner of a cable.

18. The brake caliper as claimed in claim 10, wherein the connecting device functions as a cooling element.

19. A brake caliper of a brake, particularly of disc brake for motor vehicles, said brake caliper being constructed as a caliper and comprising;
at least two raised sections. which are opposite to one another on the same axial side of the brake disc and define a free space between them, and
a connecting device including a turnbuckle extending across said free space laterally of the brake caliper on one axial side of the brake disc, connecting together said at least two raised sections on the one side of the brake disc, said turnbuckle configured to apply a bracing force to the raised sections, the configuration of said turnbuckle being set to reduce vibration of said brake caliper during a braking process, the turnbuckle including screw threads having threadingly engaged connectors coupled to the at least two raised sections, said bracing force being one of or tension or compression depending on a rotational position of said threadingly engaged connectors.

20. The brake caliper as claimed in claim 19, wherein said brake caliper includes an outer surface, and wherein the at least two raised sections are formed at said outer surface.

21. The brake caliper as claimed in claim 19, wherein said raised sections comprise plateaus, which includes an internal screw thread.

22. The brake caliper as claimed in claim 19, wherein the connecting device functions as a cooling element.

23. A brake caliper for motor vehicles, wherein the brake caliper is constructed as a caliper, comprising:
a caliper body;
two raised sections, which are spaced from one another and located on the same axial side of said caliper body; and
a connecting device including a turnbuckle connecting together said two raised sections extending laterally of the brake caliper on one axial side of brake disc, said turnbuckle configured to apply a bracing force to the raised sections on the one side of the brake disc, the configuration of said turnbuckle being set to reduce vibration of said brake caliper during a braking process, the turnbuckle including screw threads having threadingly engaged connectors coupled to the two raised sections, said bracing force being one of tension or compression depending on a rotational position of said threadingly engaged connectors.

24. The brake caliper as claimed in claim 23, wherein said brake caliper includes an outer surface, and wherein the two raised sections are formed at said outer surface.

25. The brake caliper as claimed in claim 23, wherein said raised sections comprise plateaus, which have an internal screw thread.

26. The brake caliper as claimed in claim 23, wherein the connecting device functions as a cooling element.

27. The brake caliber as defined in claim 1 wherein the screw threads of the turnbuckle and the screw threads of the connectors are right/left-handed screw threads.

28. The brake caliber as defined in claim 10 wherein the screw threads of the turnbuckle and the screw threads of the connectors are right/left-handed screw threads.

29. The brake caliber as defined in claim 19 wherein the screw threads of the turnbuckle and the screw threads of the connectors are right/left-handed screw threads.

30. The brake caliber as defined in claim 23 wherein the screw threads of the turnbuckle and the screw threads of the connectors are right/left-handed screw threads.

* * * * *

UNITED STATES PATENT AND TRADEMARK OFFICE
CERTIFICATE OF CORRECTION

| | | |
|---|---|---|
| PATENT NO. | : 7,958,975 B2 | Page 1 of 1 |
| APPLICATION NO. | : 10/544775 | |
| DATED | : June 14, 2011 | |
| INVENTOR(S) | : Reinhard Eisengraber and Kristof Terfloth | |

It is certified that error appears in the above-identified patent and that said Letters Patent is hereby corrected as shown below:

In the Claims, Column 6, Claim 19, line 4, please delete "of or" and insert --of--.

Signed and Sealed this
Twenty-fifth Day of October, 2011

David J. Kappos
*Director of the United States Patent and Trademark Office*